United States Patent [19]

Lichon et al.

[11] 4,051,361
[45] Sept. 27, 1977

[54] VEHICLE IDENTIFICATION SIGNAL DEVICE

[76] Inventors: James F. Lichon, 1116 River Forest Drive, Saginaw, Mich. 48603; Charles Earl Cone, 5701 Woodview Pass, Midland, Mich. 48640

[21] Appl. No.: 632,396

[22] Filed: Nov. 17, 1975

[51] Int. Cl.² .............................................. B62J 5/00
[52] U.S. Cl. ................................ 362/211; 280/289 R; 340/87; 362/72
[58] Field of Search ................. 280/289 R; 340/134, 340/87, 100; 240/7.55, 8.1 R, 8.1 A, 8.18, 87, 100

[56] References Cited

U.S. PATENT DOCUMENTS

| | | | |
|---|---|---|---|
| 2,252,395 | 8/1941 | Cohen | 240/8.1 A X |
| 2,260,253 | 10/1941 | Johnson | 340/100 X |
| 2,621,283 | 12/1952 | Johnson | 240/8.18 |
| 3,012,801 | 12/1961 | Cole | 240/67 X |
| 3,287,549 | 11/1966 | Lantery | 340/87 |
| 3,487,360 | 12/1969 | Thompson | 240/8.1 R |
| 3,696,334 | 10/1972 | Demeter | 340/87 |

*Primary Examiner*—Joseph F. Peters, Jr.
*Assistant Examiner*—Donn McGiehan
*Attorney, Agent, or Firm*—Frank John Catalano

[57] ABSTRACT

A signal device is usable with motorcycles or the like to identify the presence and direction of motion of the vehicle in limited visibility situations. A mast extending upwardly from the vehicle supports the signal lamp assembly above the vehicle. A pair of transparent domes secured on the signal lamp assembly in a forward-rearward relationship with respect to the vehicle enclose separate lamps. The domes are color-coded so that the forward and rearward ends of the vehicle are identifiable without actual visual contact with the vehicle. The signal device circuit may be interconnected with the vehicle indicator circuits so as to be operable therewith. The mast may be telescopically extended to provide greater ranges of visibility.

5 Claims, 4 Drawing Figures

VEHICLE IDENTIFICATION SIGNAL DEVICE

BACKGROUND OF THE INVENTION

This invention relates generally to vehicle signal lamp devices, and more particularly to signal lamp devices usable to make the presence of a vehicle and its direction of motion more easily determinable.

Operation of a vehicle in limited visibility situations increases the hazards to both the operator and those in the area. Such situations might include night driving on a highway, operation of equipment in a construction or excavation area, use of a fork truck in a plant or factory, and numerous other topographical, meteorlogical and occupational conditions. For example, at night, red motorcyle reflectors will inform a rearwardly approaching vehicle that an object is on the road, but they convey no information as to what the object is or whether it is moving. Similarly, a single headlamp leaves doubt in the mind of a vehicle operator approaching from the front as to whether the headlamp represents a motorcycle in the middle of a lane or an auto with a headlamp out of service and straddling the road. Also, when construction equipment or fork trucks are used in areas where visibility is limited by structures, other equipment, storage racks and the like, people in the area may be able to hear the operated vehicle, but be unable to identify what and where it is or what direction it is moving in. Many other types of vehicles and hazardous situations may come to mind. Clearly, however, the problem is one of conveying adaquate information to other people in the area of the operated vehicle so that they can properly assess the danger and take the necessary precautions. Insufficient or faulty information may well increase the danger.

The use of signal lights atop a mast extending from the operated vehicle is one known method of conveying such information in limited visibility situations. Generally, these devices are suitable only to indicate presence. They do not denote motion, possible motion, or direction of motion of the object to which they are attached.

A known improvement on such devices is to connect the signal light to the vehicle brake system. This will convey further information regarding the motion of the vehicle, but only when the brakes are actually applied, and even then, the direction of motion of the vehicle may be undeterminable.

It is, therefore, an object of this invention to provide a signal device which conveys a greater amount of information about the presence and direction of motion of a vehicle to which it is attached.

It is a further object to convey such information in situations in which the vehicle itself may not be visible.

A further object of the invention is to make the forward and rearward arrangement of the vehicle determinable without visual observation of the vehicle.

Another object of the invention is to convey information regarding the use of the vehicle braking or reverse systems.

Yet another object of the invention is to convey such information peripherally about the vehicle.

It is also an object of the invention to increase the range over which such information is conveyed.

SUMMARY OF THE INVENTION

In accordance with the invention, the device employs a tubular mast secured to the vehicle by a clamping means fixed proximate the lower end of the mast. A casing mounted atop the mast has forward and rearward end walls in relation to the vehicle. A passage providing access to the casing is aligned with the hollow portion of the tubular mast. One lamp socket is disposed through the forward wall of the casing, and another through the rearward wall, so that the socket terminal means are within the casing and the lamps are insertable in the sockets externally of the casing. The circuit wires extend from the socket terminals inside the casing, through the access passage and down through the hollow mast, and extend beyond for connection to the vehicle indicator circuits. A pair of transparent domes, detachably secured at the ends of the casing, enclose the lamps. The domes are color-coded so that the forward and rearward ends of the vehicle may be identified, even without observing the vehicle. The mast may be telescopically extendable to increase the range of visibility.

BRIEF DESCRIPTIONS OF THE DRAWINGS

Ohter objects and advantages of the invention will become apparent upon reading the following detailed description and upon reference to the drawings in which.

DETAILED DESCRIPTION

Figure 1:
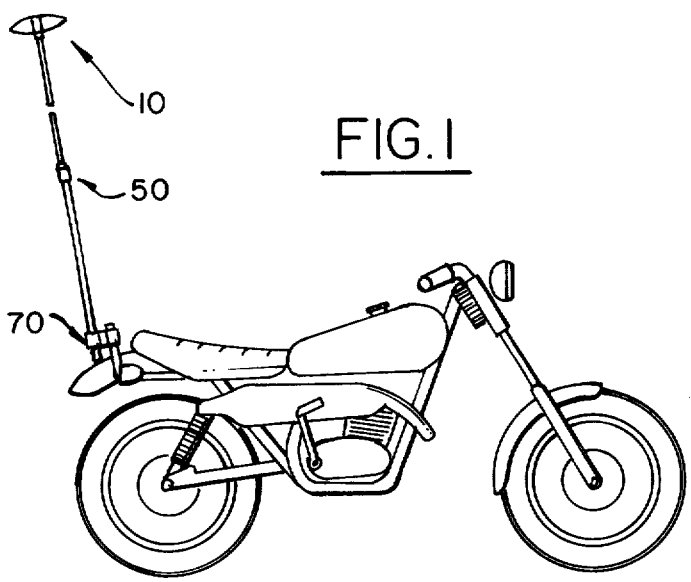
FIG. 1 is a perspective view illustrating the use of the invention on a motorcycle.

In FIG. 1, the subject signal device is illustrated in its application to a vehicle such as a motorcylce. The device consists of a signal lamp assembly 10 mounted atop a mast 50 secured to the motorcycle by a coupling 70.

Figure 2:
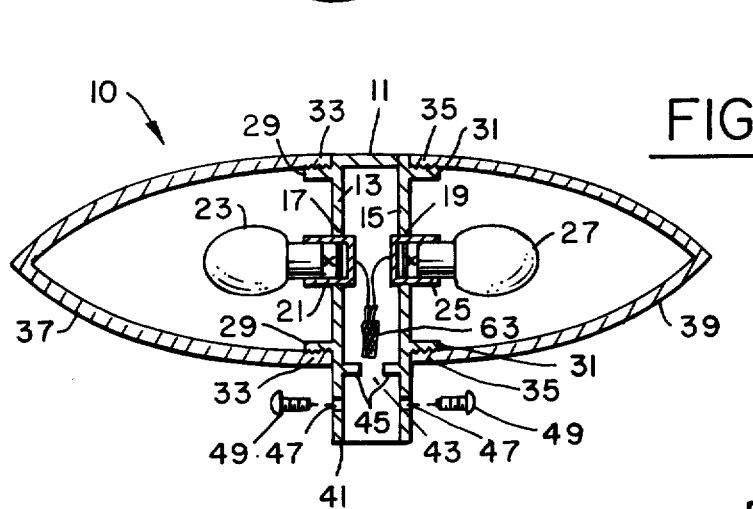
FIG. 2 is a vertical sectional view of the signal lamp assembly of the subject invention.

As can best be seen in FIG. 2, the signal lamp assembly 10 has a casing 11, preferably cylindrical, with a forward end wall 13 and a rearward end wall 15, considered in relation to the motorcycle in reference to FIG. 1. The end walls 13 and 15 are provided with apertures 17 and 19 approximately centrally located therein. A conventional low voltage incandescent lamp socket 21 is gripped in the forward wall aperture 17 with the socket terminals being accessible from within the casing 11 and the lamp 23 being insertable externally of the casing. The rearward wall aperture 19 similarly grips a second socket 25 for receiving a lamp 27, but the rearward socket 25 and lamp 27 are of the conventional dual element type. Externally threaded annular flanges 29 and 31 integrally extend outwardly from the forward and rearward end walls 13 and 15 to engage with the threaded portions 33 and 35 of forward and rearward transparent domes 37 and 39. The domes 37 and 39 are color-coded to indicate the forward and rearward alignment of the motorcycle. For example, the use of amber and red on moving vehicles to indicate forward and rearward ends respectively is becoming widely accepted and recognized. Preferably, the configuration of the domes 37 and 39 will also give the signal lamp assembly 10 a directional impact, as for example the football shaped arrangement shown. An annular sleeve 41 extends downwardly from the lower portion of the casing 11 and an access passage 43 through the lower portion of the casing 11 is centered on the sleeve 41.

The sleeve 41 is also provided with a plurality of threaded apertures 47 for receiving set screws 49.

Figure 3:
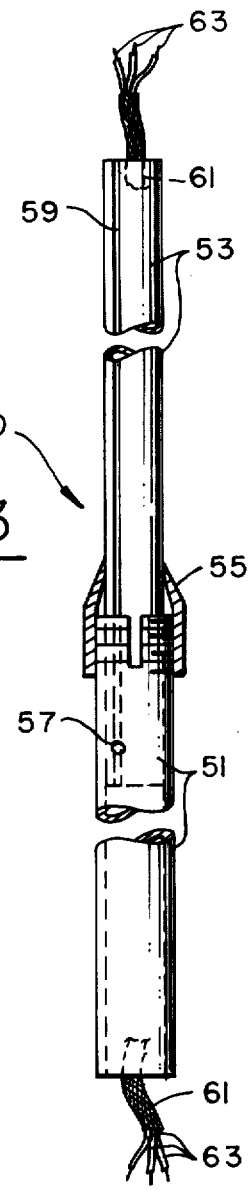
FIG. 3 is a fragmentary vertical sectional view of the mast of the subject invention.

The mast 50 consists of a fixed tubular member 51 and one or more telescopically extendible and retractable sliding tubular members 53, as shown in FIG. 3. The upper end of the member 51 is adapted so that the sliding member 53 may be secured in any desired position of extension. This may be accomplished, for example, by use of a threaded tapered collar 55 cooperable with the threaded and slotted end of the fixed member 51 to clamp the sliding member 53 in position. In addition, an interior knurl 57 may be provided proximate the upper end of the fixed member 51 for cooperation with an exterior striation 59 along the length of the sliding member 53, to prevent rotation of the sliding member 53 relative to the fixed member 51. The circuit means, preferable in the form of a multiconductor recoiling telephone-type cable 61 extends through the hollow portion of the mast 50 and beyond its upper and lower ends. The upper ends of the cable wires 63 are connected through the access passage 43 to the appropriate socket terminals in the casing 11, as shown in FIG. 2. The lower ends of the cable wires 63 are extended for connection to the motorcycle indicator circuits (not shown). The upper end of the sliding member 53 is inserted in the sleeve 41 of the casing 11, with its top face abutting the shoulder 45, and is secured in position by the set screws 49.

Figure 4:
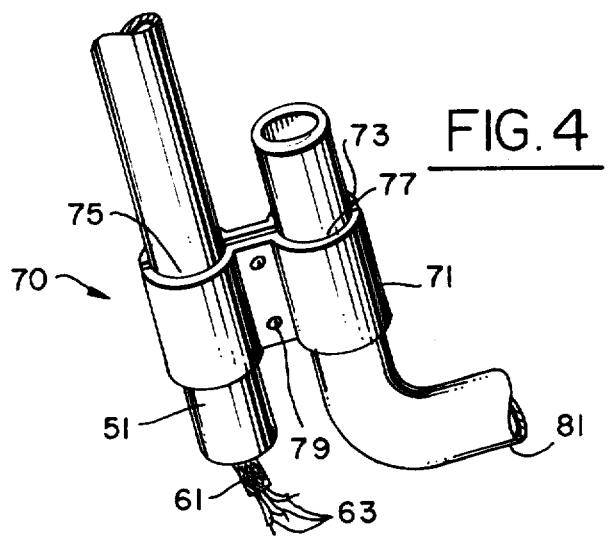
FIG. 4 is a perspective view of a coupler for use with the subject invention.

The means for securing the lower portion of the mast fixed member 51 to the motorcycle preferably will be of the pipe coupler type, as shown in FIG. 4. The coupler 70 consists of a pair of members 71 and 73 defining pipe receiving channels 75 and 77 therebetween. The members may be drawn together to clamp the pipes in the channels 75 and 77 by means of one or more screws 79. The channels 75 an 77 may be aligned in parallel, T, or angular relationship so that the fixed member 51 of the mast 50 may be coupled to any convenient pipelike member 81 on the motorcycle, such as lamp bars, safety guards, muffler pipes and the like.

In mounting the signal device on the vehicle, the mast 50 with the signal lamp assembly 10 attached is secured to a convenient member of the vehicle by use of the coupler 70. Once so secured, the set screws 49 in the casing sleeve 41 of the assembly 10 are loosened so that the appropriate front-rear alignment of the assembly 10 in relation to the vehicle can be made. The set screws 49 are then tightened to secure the alignment. The cooperation of the striation 59 with the knurl 57 insures that vibration will not cause the telescoping members 51 and 53 to rotate, changing the alignment. The circuit wires 63 may then be connected to the appropriate vehicle indicator circuits and the device is ready for operation.

While the invention has been described specifically in relation to motorcycles, it will be noted that its application extends to many types of vehicles.

Furthermore, many variations may be made from the specific embodiment described. For example, the sleeve 41 may be angularly disposed in relation to the lamp assembly 10, so that the mast 50 can extend upwardly and away from the vehicle without altering the directional aspect of the lamp assembly. It may also be desireable to use more than two lamp-socket arrangements, or perhaps a flasher arrangement, to increase the signalling capabilities of the device. Many alternatives, modifications and variations will be apparent to those skilled in the art in the light of the foregoing description. Accordingly, it is inteded to embrace all such alternatives, modifications and variations as fall within the spirit and scope of the appended claims.

What is claimed is:

1. For use with vehicles such as motorcycles or the like, a signal device comprising:
    a casing having forward and rearward lamp sockets disposed thereon;
    forward and rearward transparent domes detachably secured to said casing, each of said domes being cooperable with said casing to enclose one of said lamp sockets, said domes being color coded to indicate the forward and rearward directions;
    circuit means connected at one end to said lamp sockets for connection at the other end to the vehicle indicator circuits; and
    a mast having a first tubular member adapted proximate its lower end for attachment to the vehicle and a second tubular member secured at its upper end to said casing, said second member being telescopically extendible from and retractable into said first member, said first member having a knurl disposed on its inner wall proximate its upper end and said second member having a striation substantially along the length of its outer wall, said knurl being cooperable with said striation to prevent rotational motion of said second member in relation to said first member.

2. The device according to claim 1, said rearward lamp socket being adapted to receive a dual-element lamp.

3. The device according to claim 1 further comprising means for releasably securing said second member in any selected extended relationship with respect to said first member.

4. The device according to claim 1, said casing having a sleeve downwardly depending therefrom for receiving the upper end of said second member therein.

5. The device according to claim 4, further comprising means for releasably securing said sleeve to the upper end of said second member in any selected radial relationship, whereby said casing may be aligned with the vehicle.

* * * * *